United States Patent
Takeuchi

(10) Patent No.: US 7,543,742 B2
(45) Date of Patent: Jun. 9, 2009

(54) READER/WRITER FOR CONTACTLESS INTEGRATED CIRCUIT CARDS AND MANAGEMENT SYSTEM FOR VENDING MACHINES

(75) Inventor: Hiroyoshi Takeuchi, Aichi-ken (JP)

(73) Assignee: Denso Wave Incorporated, Tokyo (JP)

( * ) Notice: Subject to any disclaimer, the term of this patent is extended or adjusted under 35 U.S.C. 154(b) by 0 days.

(21) Appl. No.: 11/878,657

(22) Filed: Jul. 26, 2007

(65) Prior Publication Data

US 2008/0048034 A1    Feb. 28, 2008

(30) Foreign Application Priority Data

Aug. 23, 2006   (JP) ............................... 2006-226570

(51) Int. Cl.
  *G06K 5/00*    (2006.01)
  *G06F 7/08*    (2006.01)
  *G06K 19/06*   (2006.01)
(52) U.S. Cl. ...................... 235/380; 235/381; 235/382; 235/492
(58) Field of Classification Search ......... 235/379–382, 235/382.5, 487, 492
  See application file for complete search history.

(56) References Cited

U.S. PATENT DOCUMENTS

2005/0170784 A1* 8/2005 Ariyoshi et al. .......... 455/67.13
2006/0289650 A1* 12/2006 Taylor et al. ................. 235/451
2007/0057057 A1* 3/2007 Andresky et al. ........... 235/451

FOREIGN PATENT DOCUMENTS

| JP | S62-118493 | 5/1987 |
| KR | 2001-0091463 | 10/2001 |
| KR | A-2004-029873 | 12/2003 |
| KR | WO 2004/056005 | 8/2005 |

OTHER PUBLICATIONS

Office Action dated Nov. 27, 2008 in corresponding Korean patent application No. 10-2007-0077519 (and English translation).

* cited by examiner

*Primary Examiner*—Thien M. Le
*Assistant Examiner*—April A Taylor
(74) *Attorney, Agent, or Firm*—Posz Law Group, PLC

(57) ABSTRACT

A handy reader/writer has a data transmitting and receiving units and a control unit. The transmitting and receiving units communicate with a contactless IC card placed within a communication area of the communicating unit by using first electromagnetic waves outputted from an antenna. The control unit judges whether or not the card is now in communication with a second reader/writer. If the control unit detects the card communicating with the second reader/writer by using second electromagnetic waves, the control unit forbids the antenna outputting the first electromagnetic waves. If the control unit does not detect the card communicating with the second reader/writer, the control unit starts communicating with the card placed. The second reader/writer does not output the second electromagnetic waves when detecting the first electromagnetic waves, and starts communicating with the card when detecting no first electromagnetic waves.

10 Claims, 7 Drawing Sheets

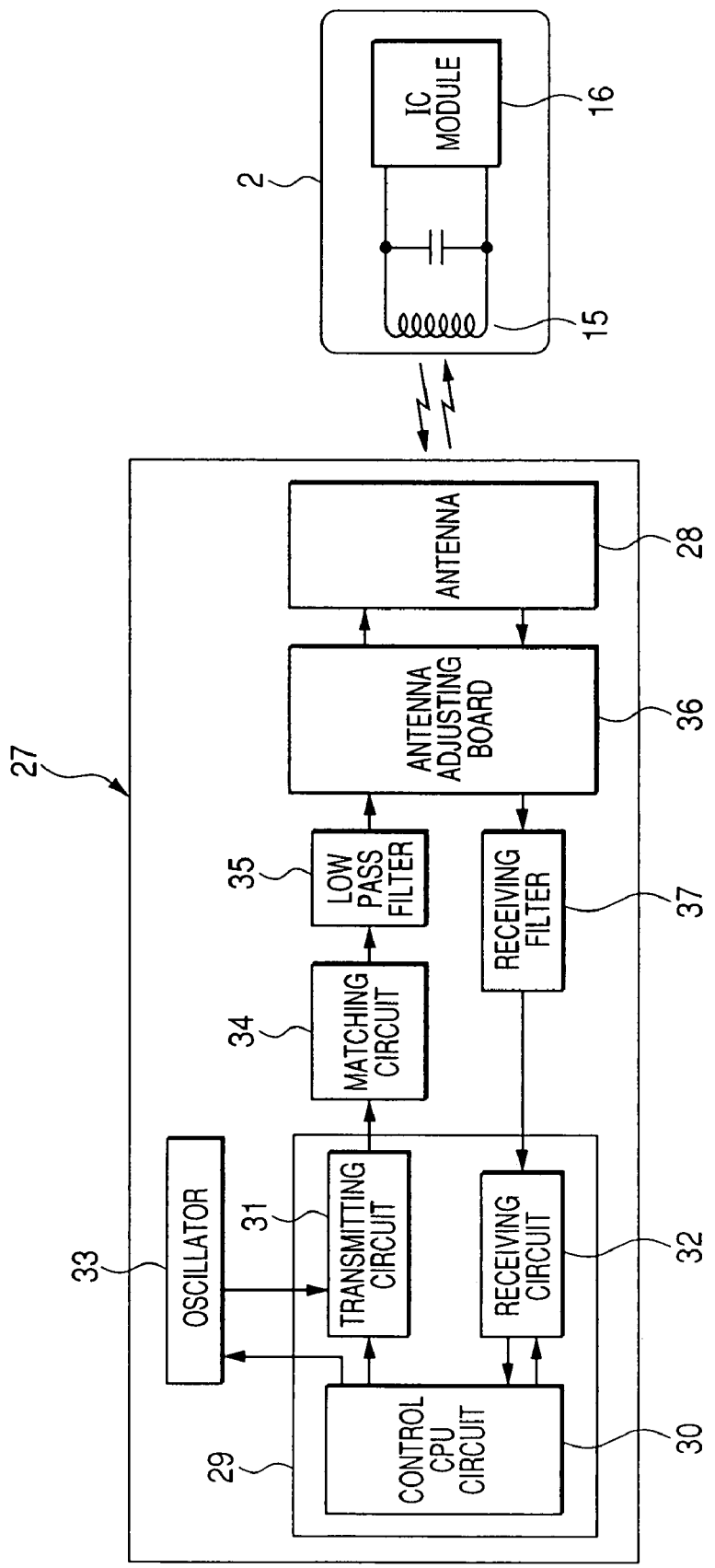

FIG. 7

| | CONTROLLED UNIT | TYPES OF INFORMATION | CONTENTS OF INFORMATION |
|---|---|---|---|
| PARAMETERS | READER/WRITER PORTION 27 | TRANSMISSION CONTROL | PARAMETERS FOR HANDSHAKING |
| | | | COMMUNICATION SEQUENCE NO. |
| | | | STATE TRANSFER FLAG |
| | | RECEPTION CONTROL | PARAMETERS FOR HANDSHAKING |
| | | | COMMUNICATION SEQUENCE NO. |
| | | | STATE TRANSFER FLAG |
| | READER/WRITER PORTION 12 | TRANSMISSION CONTROL | PARAMETERS FOR HANDSHAKING |
| | | | COMMUNICATION SEQUENCE NO. |
| | | | STATE TRANSFER FLAG |
| | | RECEPTION CONTROL | PARAMETERS FOR HANDSHAKING |
| | | | COMMUNICATION SEQUENCE NO. |
| | | | STATE TRANSFER FLAG |
| DATA | — | TRANSMISSION DATA OF TERMINAL | TRANSFER DATA |
| | | | DATA CHECK CODE |
| | | RECEPTION DATA OF TERMINAL | TRANSFER DATA |
| | | | DATA CHECK CODE |

READER/WRITER FOR CONTACTLESS INTEGRATED CIRCUIT CARDS AND MANAGEMENT SYSTEM FOR VENDING MACHINES

CROSS-REFERENCE TO RELATED APPLICATION

This application is based upon and claims the benefit of priority of the prior Japanese Patent Application 2006-226570 filed on Aug. 23, 2006 so that the contents of which are incorporated herein by reference.

BACKGROUND OF THE INVENTION

1. Field of the Invention

The present invention relates to a reader/writer which communicates with a contactless integrated circuit (IC) card by using electromagnetic waves to read and write data from/to the card, and a management system for managing vending machines by transferring data between the reader/writer and each vending machine through the card.

2. Description of Related Art

Vending machines sell commodities or products such as cans of refreshing drink, packages of cigarettes and the like. To manage the vending machines for stock management, commodities supplementation and the like, a service man of a managing agency such as a dealer circulates among the vending machines to collect stock data of commodities from the vending machines. In this case, because received moneys are held in each vending machine, it administratively comes into question that a service man opens a door of the machine without permission of an owner of the machine to collect stock data of commodities from the machine. the machine.

To solve this problem, Published Japanese Patent First Publication No. S62-118493 (1987) discloses a stock management apparatus for vending machines. In this apparatus, a service man collects stock data of commodities from a vending machine through an integrated circuit (IC) card without opening a door of the machine. More specifically, a service man possesses an IC card and a reader, and the machine is equipped with a reader/writer for communicating with the card to read and write data from/to the card. When the service man inserts the card into the reader/writer of the machine, stock data of commodities in the machine is automatically written into the card, and the service man takes out the card from the reader/writer. Then, the service man inserts the card into the reader to transfer the data of the card to the reader. The service man supplies various types of commodities to the machine on the basis of the stock data displayed on the reader.

Recently, consumers or customers have possessed contactless (or non-contact) IC cards (i.e., electronic money cards) having an automatic cashing function such as Edy cards used in Japan, Suica cards used in Japan and the like. Further, consumers have possessed portable telephones having an electronic money function. The consumers purchase commodities from vending machines by using contactless IC cards or portable telephones. In this case, a reader/writer for the card is built in each vending machine to communicate with the card to read and write data from/to the card. When a consumer makes his/her contactless IC card or portable telephone approach the reader/writer or inserts the card or telephone into an entry of the reader/writer, the consumer can purchase an article of commerce.

In case of a management system for vending machines, a service man holds a contactless IC card and a handy reader/writer (i.e., handy terminal) to manage or maintain each of vending machines. When the service man makes the card approach the reader/writer of the machine, stock data of commodities in the machine is automatically written into the card. Then, the service man inserts the card into an entry of the handy terminal and causes the terminal to read the stock data from the card. Further, the service man can transfer data (e.g., negative data indicating cards inhibited from being used for the vending machine) necessary for the machine from the terminal to the machine through the card.

In this data transfer between the machine and the terminal through the card, electromagnetic waves are outputted from the terminal to the card to transfer data between the terminal and the card, and other electromagnetic waves are outputted from the reader/writer of the machine to the card to transfer data between the machine and the card. Therefore, when the reader/writer of the machine and the terminal are disposed close each other, electromagnetic waves outputted from the reader/writer of the machine and electromagnetic waves outputted from the terminal interfere with each other. To prevent the waves from interfering with each other, it is required to dispose the reader/writer and the terminal away from each other by a predetermined distance such that each of the reader/writer and the terminal is placed out of a communication area of the other one.

However, a volume of data to be transferred between the machine and the terminal is, for example, equal to tens kilo bytes which is almost equal to a data capacity of a several number of IC cards. Therefore, when the service man transfers data between the terminal and the machine through one card, the service man is required to repeat a data transfer between the terminal and the card and a data transfer between the machine and the card many times while repeating the detachment and attachment of the card from/to the terminal and the movement of the card between the terminal and the machine. This data transferring work is very troublesome, and it takes a long time to transfer data between the terminal and the machine. Therefore, the service man often fails to transfer data.

To solve this problem, there is an idea that the terminal itself has a function of the contactless IC card. In this case, it is enough that the terminal is moved to approach the reader/writer of the machine only once. However, the terminal is required to have a hardware such as a frequency conversion and communication control circuit in a reading/writing portion so as to act as a pseudo IC card. In this case, the terminal cannot be used for other apparatuses but be used only for vending machines. Further, a manufacturing cost of the terminal is heightened.

SUMMARY OF THE INVENTION

An object of the present invention is to provide, with due consideration to the drawbacks of the conventional handy reader/writer, a reader/writer which efficiently and reliably reads and writes even a large volume of data from/to another reader/writer through a contactless IC card.

Another object of the present invention is to provide a management system which manages a vending machine so as to efficiently and reliably transfer even a large volume of data between a reader/writer of the vending machine and a handy reader/writer through a contactless IC card.

According to one aspect of this invention, the object is achieved by the provision of a reader/writer comprising a communicating unit, a judging unit and a communication control unit. The communicating unit can output electromagnetic waves to perform a communication based on the electromagnetic waves with a contactless IC card placed within a communication area of the communicating unit. The judging unit judges whether or not the contactless IC card placed within the communication area is now in communication with a second reader/writer. The communication control unit forbids the communicating unit outputting the electromagnetic waves in response to a judgment of the judging unit indicating that the contactless IC card is now in communication with the second reader/writer. Further, communication control unit controls the communicating unit, in response to a judgment of the judging unit indicating that the contactless IC card does not communicate with the second reader/writer, to start communicating with the contactless IC card placed within the communication area.

With this configuration of the reader/writer, even though the card is placed within communication areas of the reader/writer and the second reader/writer so as to be able to communicate with each of the reader/writer and the second reader/writer, the reader/writer does not output electromagnetic waves when the card is in communication with the second reader/writer. In contrast, when the card is not in communication with the second reader/writer, the reader/writer starts communicating with the card. Therefore, a data transfer between the second reader/writer and the card is not interrupted with the electromagnetic waves of the reader/writer, and a data transfer between the reader/writer and the card is not interrupted with electromagnetic waves of the second reader/writer.

Accordingly, a large volume of data can reliably and efficiently be transferred between the reader/writer and the second reader/writer through the card while placing the card all the time within the communication areas of the reader/writer and the second reader/writer.

According to another aspect of this invention, the object is achieved by the provision of a vending machine management system, comprising a contactless IC card, a handy reader/writer and a vending machine. The contactless IC card is placed within communication areas of the handy reader/writer and the vending machine. The handy reader/writer outputs first electromagnetic waves to start a communication based on the first electromagnetic waves with the contactless IC card when the contactless IC card does not communicates with the vending machine. The vending machine outputs second electromagnetic waves to start a communication based on the second electromagnetic waves with the contactless IC card when the contactless IC card does not communicates with the handy reader/writer.

Accordingly, a large volume of data can reliably and efficiently be transferred between the handy reader/writer and the vending machine while the contactless IC card is placed all the time within the communication areas of the handy reader/writer and the vending machine.

BRIEF DESCRIPTION OF THE DRAWINGS

FIG. 3 shows an electric circuit of the card shown in FIG. 2 and a block diagram of a reader/writer portion of the handy terminal shown in FIG. 2;

FIG. 7 shows an example of information written in a memory of the card.

DETAILED DESCRIPTION OF THE PREFERRED EMBODIMENTS

An Embodiment of the present invention will now be described with reference to the accompanying drawings. In this embodiment, as an example, a management system manages a vending machine by using a handy reader/writer with a contactless IC card. The handy reader/writer may be an optical reader or a barcode handy terminal with a readable and writable function for information such as a barcode.

Figure 1:
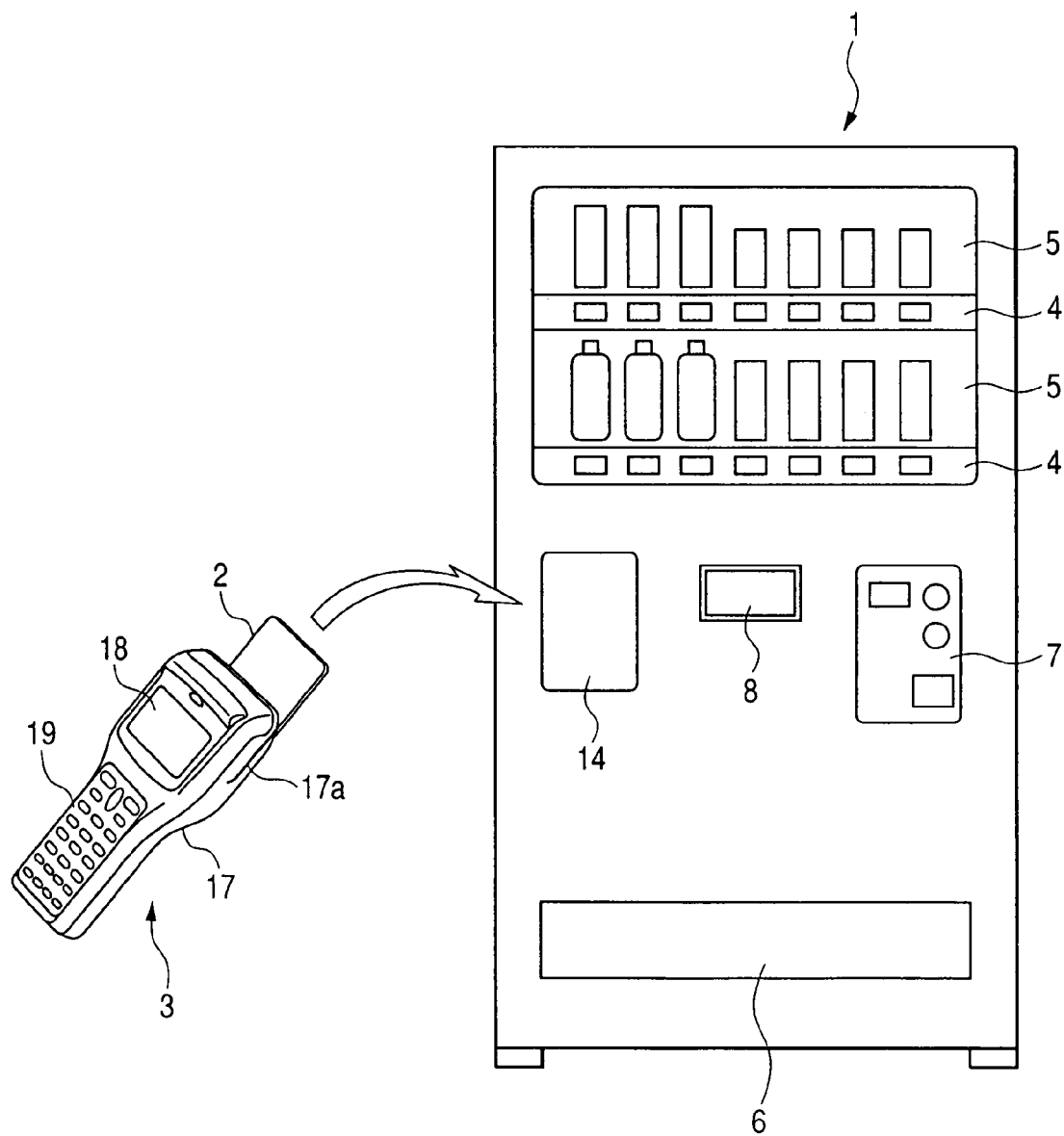
FIG. 1 shows an external appearance of a vending machine management system composed of a vending machine, a handy reader/writer and a contactless IC card inserted into the reader/writer according to an embodiment of the present invention.
Figure 2:
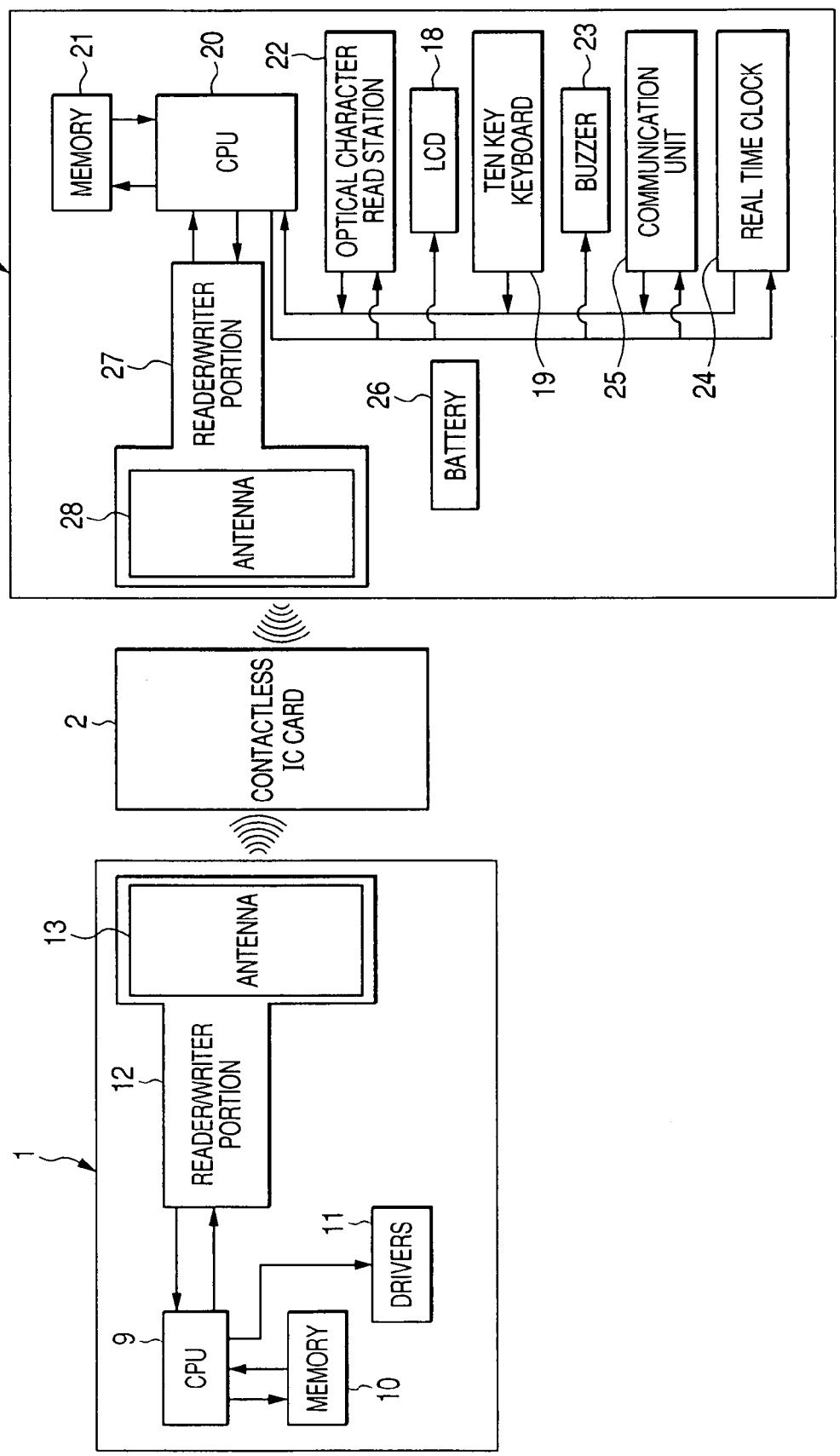
FIG. 2 is a block diagram of the management system shown in FIG. 1 according to this embodiment.

FIG. 1 shows an external appearance of a vending machine management system composed of a vending machine, a handy reader/writer and a contactless IC card inserted into the reader/writer according to an embodiment of the present invention. FIG. 2 is a block diagram of the management system shown in FIG. 1 according to this embodiment.

As shown in FIG. 1 and FIG. 2, a vending machine management system according to this embodiment has a large number of vending machines 1 (only one vending machine 1 is shown for convenience) disposed in various positions by a managing agency, a contactless IC card 2 managed or possessed for the maintenance of the machines 1 by a service man of the managing agency, and a handy reader/writer 3 (hereinafter, called handy terminal) possessed by the service man. Each vending machine 1 sells cans of refreshing drink, bottles of refreshing drink and the like as articles of commerce. The handy terminal 3 denotes a reader/writer for a contactless IC card claimed in claims.

The machine 1 is equipped with a stationary vending machine reader/writer portion 12 with an antenna 13. The antenna 13 outputs electromagnetic waves to the card 2 to perform a communication based on the electromagnetic waves with the card 2. As described in detail later, when the card 2 is placed within communication areas of the reader/writer portion 12 and the terminal 3, each of the reader/writer portion 12 and the terminal 3 judges whether or not the other one outputs electromagnetic waves, and outputs electromagnetic waves, when detecting the other one not outputting electromagnetic waves, to start a communication based on the electromagnetic waves with the card 2. Therefore, the reader/writer portion of the vending machine 1 and the terminal 3 alternately communicate with the card 2 while the reader/writer portion 12 and the terminal 3 perform a CPU handshaking with each other and time sharing control.

As shown in FIG. 1, on a front portion (or front door portion) of a rectangular box shaped body of the machine 1, there are a sample exhibiting section 5 for various articles of commerce, an article selecting switch 4 disposed in the section 5 for each of article types, an article outputting port 6 outputting a type of article selected by pushing one switch 4, a money transacting unit 7 (i.e., coin mechanism) having a coin and bill input port and a change giving port, a display 8 displaying a necessary message about articles, and a data reading and writing portion 14 for reading and writing data from/to the card 2 when the card 2 approaches the portion 14. Further, in the body of the machine 1, there are a plurality of columns corresponding to types of articles such as cans of drink, bottles of drink and the like (not shown), and each column has an accommodating box to receive the corresponding type of articles. Moreover, the machine 1 has a cooling and warming unit for cooling or warming articles to an adequate temperature, a vending mechanism for releasing a selected type of article to the article outputting port 6, and sensors such as a sensor for detecting a shortage of articles and a sensor for detecting absence of stock.

As shown in FIG. 2, the machine 1 further has a central processing unit (CPU) 9 such as a microcomputer for controlling an operation of the machine 1, a memory 10 connected with the CPU 9 for storing various types of data including management data necessary for the management of the machine 1, and various drivers 11 for driving the unit 7 and the mechanism 6 under control of the CPU 9. The CPU 9 is adapted to collect the management data of the machine 1.

Further, the machine 1 has the reader/writer portion 12 with the antenna 13 for reading data from the card 2 and writing data of the machine 1 to the card 2 during the communication with the card 2. The reader/writer portion 12 has both a data transmitting circuit (not shown) and a data receiving circuit (not shown) connected with the antenna 13 and a communication control circuit (not shown) controlling the data transmission of the transmitting circuit and the data reception of the receiving circuit. The antenna 13 is disposed inside the reading and writing portion 14.

The communication control circuit of the vending machine reader/writer portion 12 gives a power signal to the antenna 13 through the transmitting circuit. The antenna 13 outputs electromagnetic waves in response to the power signal. When the card 2 is moved and approaches the reader/writer portion 12 within a communication area of the reader/writer portion 12, the card 2 receives an electric power from the electromagnetic waves and is activated so as to output electromagnetic waves induced in the card 2, and a communication based on the electromagnetic waves is started between the reader/writer portion 12 and the card 2. To transfer data from the reader/writer portion 12 to the card 2, the transmitting circuit modulates data sent from the CPU 9 to an output signal and transmits the output signal to the card 2 through the antenna 13. To transfer data from the card 2 to the reader/writer portion 12, the receiving circuit demodulates an input signal received in the antenna 13 to demodulated read data, and the communication control circuit extracts the demodulated data and stores the data in the memory 11 through the CPU 9.

The vending machine 1 can further receive a contactless IC card having an account settling function or a cashing function and being possessed by a consumer to sell a particle of commerce selected by the consumer. As the contactless IC card possessed by a consumer, an electronic card such as an "Edy card", "Suica card" used in Japan or the like, a debit card, a cash card, a credit card, and a prepaid card such as a gift card can be applied. Further, a portable telephone (or iD credit) called "Osaifu-ketai" meaning a purse-like portable phone can be applied as a contactless IC card possessed by a consumer. When a consumer causes the card 2 to approach the vending machine reader/writer portion 12, the CPU 9 of the machine 1 judges based on the data read in the reader/writer portion 12 in a normal operation mode whether or not a type of article selected by the consumer can be sold. In case of the affirmative judgment, the article is sold in response to the corresponding pushed switch 4, and an account is automatically settled. Accordingly, the consumer can purchase an article of commerce by using a contactless IC card. The consumer also can purchase an article of commerce by putting a money into the unit 7.

Further, in this embodiment, when the card 2 for maintenance is moved and approaches the reader/writer is portion 12, the reader/writer portion 12 starts communicating with the card 2. Then, in a data communication mode, the reader/writer portion 12 reads data (e.g., negative data indicating cards inhibited from being used for the vending machine 1) necessary for the machine 1 from the card 2 and writes transaction data to the card 2. For example, the transaction data contain transaction records of articles and sale data of articles. The card 2 for maintenance may have an account settling function or a cashing function of the contactless IC card possessed by a consumer.

Next, the contactless IC card 2 for maintenance is described in detail with reference to FIG. 3. FIG. 3 shows an electric circuit of the card 2 and a block diagram of a reader/writer portion of the handy terminal 3 communicating with the card 2. The card 2 is made of a plastic plate and is formed in a card shape.

As shown in FIG. 3, the card 2 has an antenna 15 and an IC module 16 controlling the antenna 15. The antenna 15 has a coil and a capacitor connected in parallel with each other to communicate with the terminal 3 and the reader/writer portion 12 of the vending machine 1 by electromagnetic waves. The IC module 16 executes data communication processing and stores data received from the terminal 3 and the reader/writer portion 12. The IC module 16 has a rectifying and smoothing circuit for obtaining a driving power from each of power feeding signals sent from the terminal 3 and the reader/writer portion 12, a CPU for controlling the communications, a modulating and demodulating circuit for modulating a transmission signal and demodulating a received signal, a read only memory (ROM) storing operation programs and the like, and a memory such as an electrically erasable and programmable ROM (EEPROM) storing, reading and writing data. These circuits, CPU and ROMs are made as one chip.

A contactless IC card having a cashing function and possessed by a consumer has a hardware configuration equivalent to that of the card 2 for maintenance. The card having a cashing function further stores a consumer identification number and electronic money information such as cash balance information in a memory of an IC module. Further, the card has an account settling function, so that electronic money can be automatically charged into the card.

Next, the handy terminal 3 according to this embodiment is described in detail with reference to FIG. 1, FIG. 2 and FIG. 3. This terminal 3 has both a function of a handy reader/writer being readable and writable data from/to a contactless IC card and a function of an optical barcode scanner being readable optical characters such as barcodes and the like.

As shown in FIG. 1, the terminal 3 has a body case 17 shaped so as to be held by one hand of a service man. On an upper surface of the case 17, the terminal 3 has a liquid crystal display (LCD) 18 and a ten key keyboard 19 operable by the other hand of the service man. On a top upper surface of the case 17, the terminal 3 has a read station for reading barcodes. On a top lower surface of the case 17, the terminal 3 has a holder portion 17a for holding front and rear surfaces of the card 2 inserted into the portion 17a.

As shown in FIG. 2, into the case 17, the terminal 3 has a CPU 20 such as a microcomputer connected with the display 18 and the keyboard 19, and a memory 21 connected with the CPU 20. The CPU 20 controls all operations of the terminal 3. The terminal 3 further has an optical character read station 22, a buzzer 23, a real time clock 24 and a communication unit 25 connected with the CPU 20. The read station 22 has a light receiving sensor made of a CCD area sensor, an image forming lens and an illuminator. The communication unit 25 is operated based on the Bluetooth (registered mark), IrDA (Infrared Data Association) or the like.

The terminal 3 further has a reader/writer portion 27 connected with the CPU 20, and a battery 26 supplying a driving power to all elements of the terminal 3. The reader/writer portion 27 has an antenna 28 disposed on the top side of the case 17. The antenna 28 is made of an antenna coil and a capacitor connected in parallel to each other. The antenna 28 outputs electromagnetic waves, so that the card 2 closely moved toward the terminal 3 is activated. The reader/writer portion 27 communicates with the card 2 by the electromagnetic waves to read and write data from/to the card 2.

As shown in FIG. 3, the reader/writer portion 27 has an oscillator 33 generating carrier waves set at a frequency of 13.56 MHz, and a communication control unit 29 controlling communications with the card 2. The control unit 29 has a control .CPU circuit 30 including a microcomputer, a transmitting circuit 31 for modulating write data set by the CPU circuit 30 to a transmission signal with the carrier waves, and a receiving circuit 32 for demodulating a reception signal to read data. The reader/writer portion 27 further has a matching circuit 34 performing a matching operation for the transmission signal, a low pass filter 34 for removing noises from the transmission signal, an antenna adjusting board 36, and a receiving filter 37 for receiving the reception signal from the card 2 through the antenna 2 and the board 36 and removing noises included in the reception signal.

The transmission signal outputted from the circuit 31 is transmitted to the antenna 28 through the circuit 34, filter 35 and board 36 and is outputted as modulated electromagnetic waves. Therefore, when the card 2 is moved and approaches the reader/writer portion 27, the modulated electromagnetic waves outputted from the reader/writer portion 27 are fed to the card 2 as a driving power and the transmission signal. In response to the electromagnetic waves, an alternating current is generated in the card 2, and the transmission signal superimposed into the electromagnetic waves is stored in the IC module 16 of the card 16 as the write data of the terminal 3. Further, when the antennal 28 receives a reception signal from the card 2, the reception signal is transmitted to the receiving circuit 32 through the board 36 and filter 37 and is demodulated to read data. Then, the read data is processed in the CPU 20 and is stored in the memory 21.

Accordingly, the reader/writer portion 27 can communicate with the card 2 by electromagnetic waves to read and write data from/to the card 2. The receiving and transmitting circuits 31 and 32 and the antenna 28 act as a communicating unit as claimed in claims.

Figure 4A:
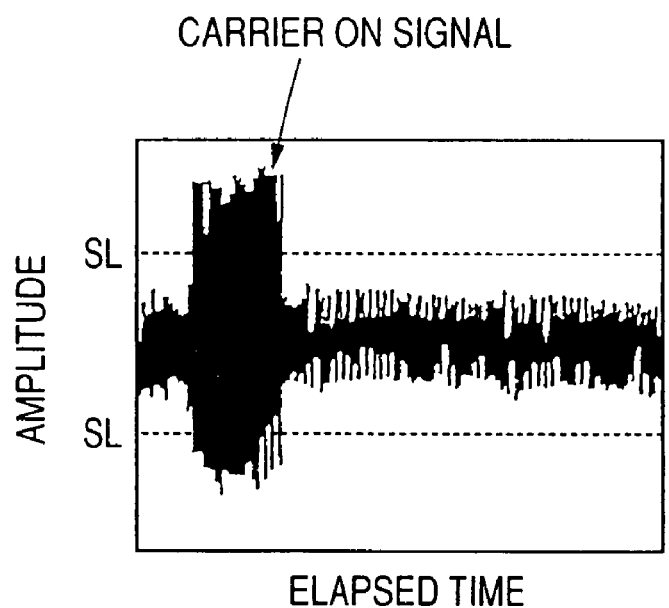
FIG. 4A shows a waveform of a carrier on signal first outputted from the reader/writer portion shown in FIG. 3.
Figure 4B:
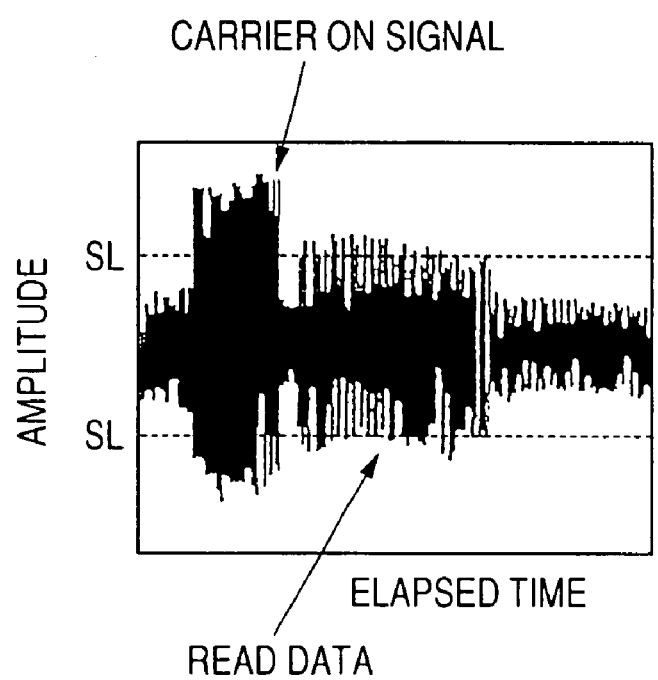
FIG. 4B shows a waveform of a response signal outputted from the card shown in FIG. 3 in response to the carrier on signal shown in FIG. 4A.

An operation of the reader/writer portion 27 in a data communication mode is described in detail with reference to FIG. 4A and FIG. 4B. FIG. 4A shows a waveform of a carrier on signal first outputted from the reader/writer portion 27 to the card 2, while FIG. 4B shows a waveform of a response signal outputted from the card 2 in response to the carrier on signal of the terminal 3.

When the card 2 is disposed within a communication area of the terminal 3 on condition that the card 2 does not communicate with another reader/writer such as the reader/writer portion 12, the reader/writer portion 27 starts communicating with the card 2. More specifically, the portion 27 outputs electromagnetic waves (i.e., carrier on signal) shown in FIG. 4A to the card 2, and the portion 27 is set to an interruptible state to allow the reception of a signal sent from the card 2. The carrier on signal has high-level carrier waves. In response to the electromagnetic waves, the card 2 is activated, and the portion 27 receives a response signal shown in FIG. 4B from the card 2 during a predetermined period of time. The predetermined period of time is appropriately set at a value sufficient to judge whether or not the card 2 outputs a response signal. The response signal has high carrier waves corresponding to read data which follows high carrier waves corresponding to the carrier on signal. The response signal is demodulated in the circuit 32 to the read data, and the read data is stored. In this demodulation, the circuit 32 compares a level of the carrier waves corresponding to the read data with a predetermined level SL preset for noise removal, and digitalizes a portion of the carrier waves exceeding the level SL to obtain the read data.

As shown in FIG. 1, when the card 2 for maintenance is held in the holder portion 17a of the terminal 3 to place the card 2 within a communication area of the terminal 3, the reader/writer portion 27 intends to write data (e.g., negative data indicating cards inhibited from being used for the vending machine 1) to the card 2, and the reader/writer portion 27 intends to read data (e.g., transaction data such as transaction records of articles, sale data of articles and the like) from the card 2. Further, when the card 2 for maintenance is moved and placed within a communication area of the reader/writer portion 12, the reader/writer portion 12 intends to read and write data from/to the card 2.

In this embodiment, the card 2 held in the holder portion 17a of the terminal 3 is moved and approaches the reader/writer portion 12 to place the card 2 within the communication areas of both the terminal 3 and the reader/writer portion 12, and the terminal 3 and the reader/writer portion 12 alternately communicate with the card 2 while the terminal 3 and the reader/writer portion 12 perform a CPU handshaking with each other and time sharing control.

To alternately perform the communication between the terminal 3 and the card 2 and the communication between the reader/writer portion 12 and the card 2, the control unit 29 (i.e., CPU circuit 30) of the terminal 3 judges based on a software program of the unit 29 whether or not the card 2 placed within a communication area of the terminal 3 is now in communication with the reader/writer portion 12 representing another read/writer. If the card 2 is now in communication with the reader/writer portion 12, the control unit 29 forbids the antenna 28 outputting electromagnetic waves, and the terminal 3 does not communicate with the card 2. If the card 2 does not communicate with the reader/writer portion 12 or when the card 2 stops communicating with the reader/writer portion 12, the terminal 3 starts communicating with the card 2. That is, the terminal 3 outputs a carrier on signal shown in FIG. 4A and receives a reception signal shown in FIG. 4B from the card 2. Therefore, the control unit 29 acts as a judging unit and a communication control unit claimed in claims. In the same manner, the reader/writer portion 12 judges whether or not the card 2 placed within a communication area of the reader/writer portion 12 is now in communication with the terminal 3. If the card 2 is now in communication with the terminal 3, the reader/writer portion 12 does not communicate with the card 2. In contrast, if the card 2 does not communicate with the terminal 3 or when the card 2 stops communicating with the terminal 3, the reader/writer portion 12 starts communicating with the card 2.

The judgments in the control unit 29 are described in detail. When the card 2 is in communication with the reader/writer portion 12, the card 2 and the reader/writer portion 12 output electromagnetic waves together. These waves can be received in the antenna 28 of the reader/writer portion 27. Further, assuming that the reader/writer portion 27 outputs electromagnetic waves, the card 2 outputs a response signal in response to these waves. Therefore, the reader/writer portion 27 cannot distinguish the electromagnetic waves between the card 2 and the reader/writer portion 12 from the electromagnetic waves between the card 2 and the reader/writer portion 27. Therefore, the control unit 29 controls the antenna 28 not to output electromagnetic waves and monitors any electromagnetic waves received in the antenna 28. When the antenna 28 receives electromagnetic waves outputted from the card 2 or the reader/writer portion 12, the control unit 29 detects this reception and judges that the card 2 is now in communication with the reader/writer portion 12. In contrast, when the antenna 28 detects no electromagnetic waves, the control unit 29 judges that the card 2 does not communicate with any reader/writer.

In the same manner, when the antenna 13 of the reader/writer portion 12 not outputting electromagnetic waves receives electromagnetic waves outputted from the card 2 or the terminal 3, the reader/writer portion 12 detects this reception and judges that the card 2 is now in communication with the terminal 3. In contrast, when the antenna 13 detects no electromagnetic waves, the reader/writer portion 12 judges that the card 2 does not communicate with the terminal 3.

Figure 5A:
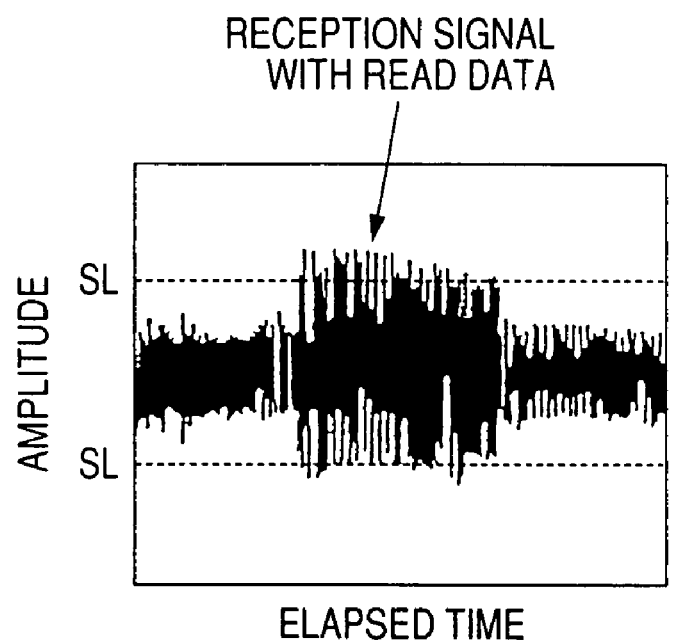
FIG. 5A shows a waveform of a reception signal with data received in the terminal not outputting electromagnetic waves.
Figure 5B:
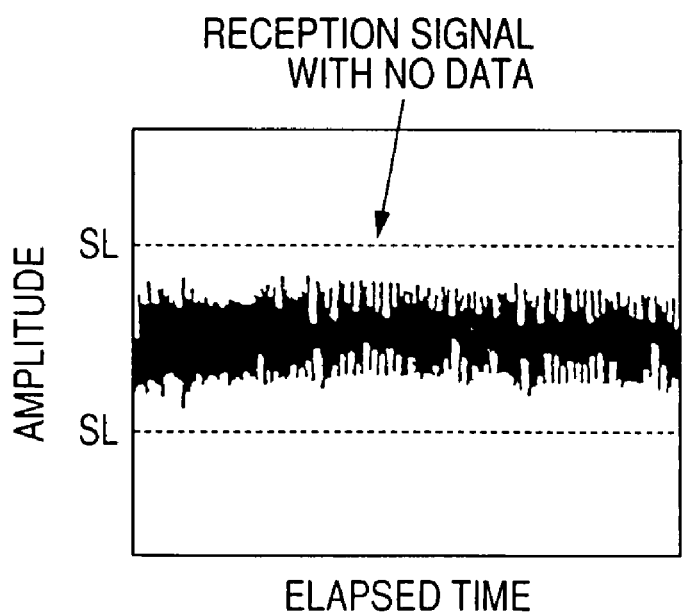
FIG. 5B shows a waveform of a reception signal with no data received in the terminal not outputting electromagnetic waves.

The judgments of the control unit 29 are described in more detail with reference to FIG. 5A and FIG. 5B. FIG. 5A shows a waveform of a reception signal with read data outputted from the card 2 and received in the terminal 3 not outputting electromagnetic waves, while FIG. 5B shows a waveform of a reception signal with no data outputted from the card 2 and received in the terminal 3 not outputting electromagnetic waves.

When the receiving circuit 32 receives a reception signal shown in FIG. 5A on condition that no electromagnetic waves are outputted from the antenna 28, the control unit 29 judges that the card 2 is now in communication with the reader/writer portion 12. That is, the circuit 32 compares a level of the reception signal with the threshold level SL. Because the reception signal shown in FIG. 5A has carrier waves exceeding the threshold level SL, the circuit 32 digitalizes a portion of the carrier waves exceeding the level SL as detected data. The control unit 29 estimates the detected data by using a software program and recognizes that, because the reception signal has the data to be transferred between the card 2 and the reader/writer portion 12, the card 2 and the reader/writer portion 12 are in communication with each other. In contrast, when the receiving circuit 32 receives a reception signal shown in FIG. 5B for a predetermined time on condition that no electromagnetic waves are outputted from the antenna 28, the control unit 29 judges that the card 2 does not communicate with the reader/writer portion 12. That is, because the reception signal shown in FIG. 5B has no carrier waves exceeding the predetermined threshold level SL, the control unit 29 recognizes that the reception signal has only noises because of no communication with the reader/writer portion 12.

Accordingly, because the communication between the terminal 3 and the card 2 and the communication between reader/writer portion 12 and the card 2 do not interfere with each other, the terminal 3 and the reader/writer portion 12 can alternately communicate with the card 2 while the terminal 3 and the reader/writer portion 12 placed within the communication areas of both the terminal 3 and the portion 12 perform a CPU handshaking with each other and time sharing control. That is, the data transfer between the terminal 3 and the reader/writer portion 12 through the card 2 can be completed without repeating any detachment and attachment of the card 2 from/to the terminal 3 or any movement of the card 2 between the terminal 3 and the reader/writer portion 12. The terminal 3 may communicate with another type of contactless IC card.

During the communication between the terminal 3 and the vending machine reader/writer portion 12, the terminal 3 is set as a master, and the reader/writer portion 12 is set as a slave. Before the reader/writer portion 12 communicates with the card 2, the terminal 3 with the card 2 is initially placed out of the communication area of the reader/writer portion 12, and the reader/writer portion 27 of the terminal 3 writes initial data for the handshaking to the card 2. The initial data contain data indicating a start timing of each data transfer between the reader/writer portion 12 and the card 2, data indicating a start timing of each data transfer between the terminal 3 and the card 2, data indicating the number of packets to be delivered between the terminal 3 and the reader/writer portion 12 through the card 2, data indicating types of data to be actually transferred between the terminal 3 and the reader/writer portion 12 through the card 2, and the like. Then, the reader/writer portion 27 temporarily stops communicating with the card 2 by causing the antenna 28 to stop outputting electromagnetic waves.

Thereafter, the terminal 3 with the card 2 is moved toward the data reading and writing portion 12 of the vending machine 1 to place the card 2 within the communication area of the reader/writer portion 12. In response to this movement of the card 2, the reader/writer portion 12 detects the card 2, and an operation state of the reader/writer portion 12 is changed from a normal vending machine operation mode to a data communication mode. Then, the terminal 3 and the reader/writer portion 12 alternately communicate with the card 2 on the basis of the initial data stored in the card 2, and transfer data (i.e., read data and write data) are transferred between the terminal 3 and the reader/writer portion 12 through the card 2 on the basis of the initial data. More specifically, the control unit 29 of the reader/writer portion 27 writes first information to the card 2 to cause the reader/writer portion 12 to perform the data transfer between the reader/writer portion 12 and the card 2, reads second information indicating a result of the data transfer between the reader/writer portion 12 and the card 2 from the card 2, and judges based on the second information whether or not the data transfer between the reader/writer portion 12 and the card 2 is appropriately and successfully performed. When the control unit 29 judges that all types of data required in the data transfer have been appropriately and successfully transferred between the terminal 3 and the reader/writer portion 12, the reader/writer portion 27 notifies a service man that the data transfer is successfully completed. This notification is performed by using the display 18 or the buzzer 23. The operation state of the reader/writer portion 12 returns to the normal vending machine operation mode after final data is transferred between the reader/writer portion 12 and the card 2.

Figure 6:
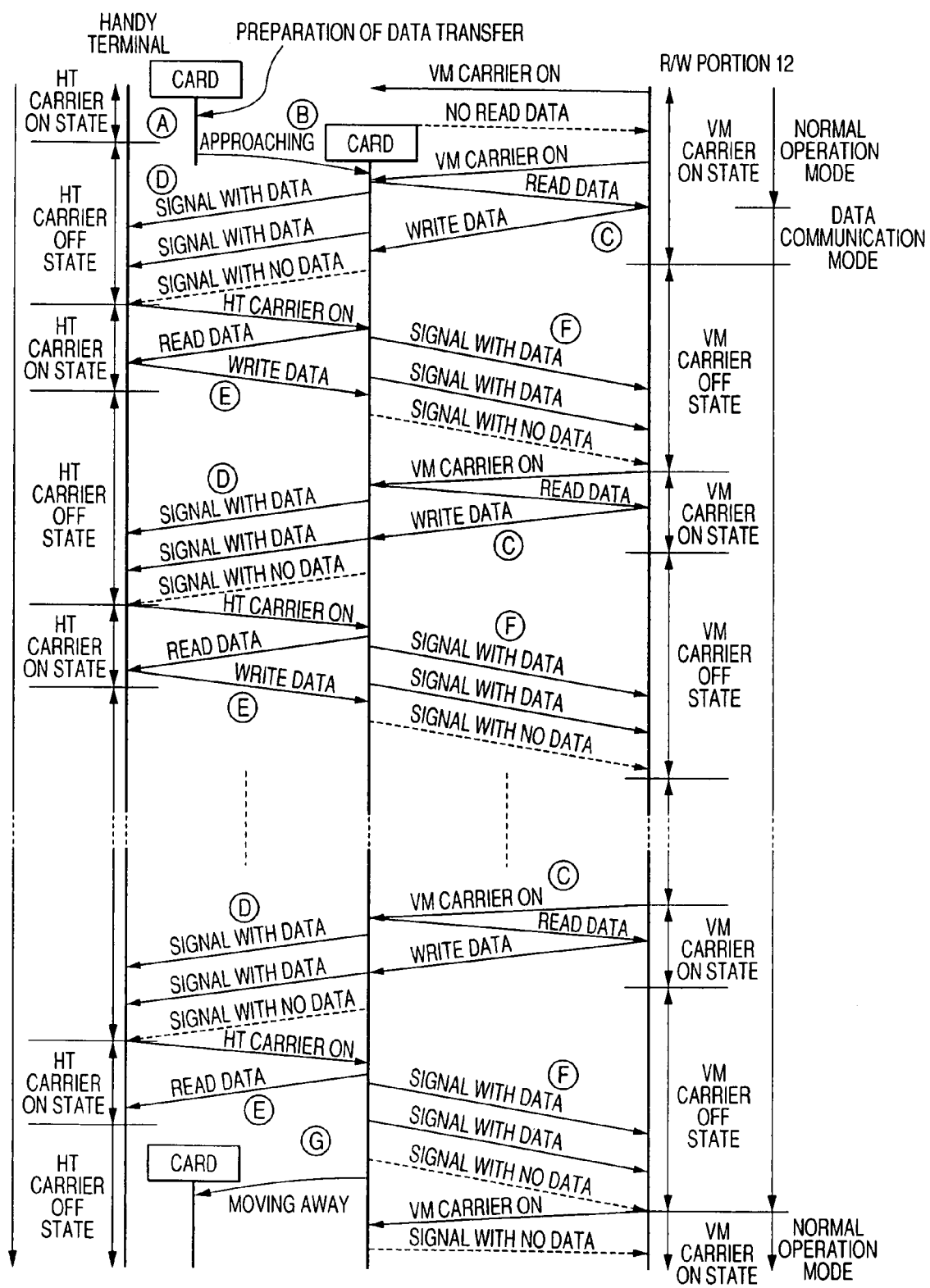
FIG. 6 is a sequence view showing the procedure of communications in the management system shown in FIG. 1.

An example of the data transfer performed among the terminal 3, the card 2 and the reader/writer portion 12 of the vending machine 1 is described with reference to FIG. 6. FIG. 6 is a sequence view showing the procedure of communications among the terminal 3, the card 2 and the reader/writer portion 12.

A service man of the vending machine 1 possesses the card 2 and the terminal 3 and travels a plurality of vending machines 1. In the memory 21 of the terminal 3, negative data or the like to be transferred to the vending machines 1 are stored in advance. In the memory 10 of each vending machine 1, transaction data such as transaction records of articles, sale data of articles and the like are stored. A volume of the negative data is almost tens kilo bites which is several times of a memory capacity of the card 2. Therefore, to transfer the negative data to the vending machine 1, the data transfer between the reader/writer portion 27 and the card 2 and the data transfer between the reader/writer portion 12 and the card 2 are necessarily repeated several times.

As shown in FIG. 6, at step A (step A is indicated in FIG. 6 by "A" surrounded by a circle), the service man prepares the data transfer. More specifically, at a position out of the communication area of the reader/writer portion 12, the service man sets the card 2 for maintenance into the holder portion 17a of the terminal 3 and operates the reader/writer portion 27. Therefore, the reader/writer portion 27 of the handy terminal 3 is set at an HT carrier on state to output electromagnetic waves from the antenna 28. Then, the reader/writer portion 27 writes initial data for CPU handshaking into the card 2, and the state of the reader/writer portion 27 is changed to an HT carrier off state to stop outputting electromagnetic waves. During this preparation, the reader/writer portion 12 of the vending machine 1 is set in a VM carrier on state and a normal operation mode. In the VM carrier on state, the antenna 13 outputs electromagnetic waves as a command signal every predetermined time. In the normal operation mode, the reader/writer portion 12 waits for a customer signal sent from a contactless IC card of a consumer.

At step B, the service man moves the reader/writer portion 27 with the card 2 near the data reading and writing portion 14 of the vending machine 1 so as to move the card 2 into the communication area of the reader/writer portion 12. Therefore, the card 2 is placed within the communication areas of both the reader/writer portions 12 and 27.

At step C, the card 2 placed within the communication area of the reader/writer portion 12 receives electromagnetic waves outputted from the antenna 13 as a command signal, and the card 2 outputs a data communication signal to the reader/writer portion 12 in response to the command signal. The reader/writer portion 12 is changed to a data communication mode in response to the data communication signal. Then, the card 2 and the reader/writer portion 12 communicate with each other on the basis of the initial data for CPU handshaking stored in the card 2. The card 2 outputs read data to the reader/writer portion 12, and the reader/writer portion 12 outputs write data to the card 2. When a volume of data predetermined based on the initial data is transfer between the card 2 and the reader/writer portion 12, the reader/writer portion 12 is set to a VM carrier off state. That is, the reader/writer portion 12 stops outputting electromagnetic waves to end this data transfer.

At step D implemented with step C, the reader/writer portion 27 continues monitoring a signal (or read data) outputted from the card 2. In this monitoring, during the communication between the card 2 and the reader/writer portion 12, the reader/writer portion 27 not outputting electromagnetic waves detects a reception signal with read data (see FIG. 5A), so that the reader/writer portion 27 maintains the HT carrier off state to continue stoppage of the outputting of electromagnetic waves from the antenna 28. During this output stoppage, a fault detection timer disposed in the reader/writer portion 27 is operated. When continuation of the output stoppage counted by the timer exceeds a predetermined period of time, the reader/writer portion 27 judges that an error has occurred in the data transfer between the card 2 and the reader/writer portion 12, and the reader/writer portion 27 performs an appropriate error recovery for the card 2.

When one data transfer between the card 2 and the reader/writer portion 12 is once finished, the reader/writer portion 27 not outputting electromagnetic waves detects a reception signal with no read data (see FIG. 5B). Therefore, at step E, a communication between the reader/writer portion 27 and the card 2 is allowed, and the reader/writer portion 27 is set to the HT carrier on state and starts outputting electromagnetic waves. Then, a data transfer between the card 2 and the reader/writer portion 27 is performed. For example, a predetermined volume of negative data is transferred from the reader/writer portion 27 to the card 2.

At step F implemented with step E, the reader/writer portion 12 continues monitoring a signal (or read data) outputted from the card 2. In this monitoring, during the data transfer between the card 2 and the reader/writer portion 27, the reader/writer portion 12 not outputting electromagnetic waves detects a reception signal with read data (see FIG. 5A), so that the reader/writer portion 12 maintains the VM carrier off state to continue stoppage of the outputting of electromagnetic waves from the antenna 13. During this output stoppage, when continuation of the output stoppage counted by the timer exceeds a predetermined period of time, the reader/writer portion 27 judges that an error has occurred in the data transfer between the card 2 and the reader/writer portion 27, and the reader/writer portion 27 performs an appropriate error recovery for the card 2. When one data transfer between the card 2 and the reader/writer portion 27 is once finished, the reader/writer portion 12 not outputting electromagnetic waves detects a reception signal with no read data (see FIG. 5B) and is set to the VM carrier on state.

This procedure at step C, step D and step E is repeatedly performed. To alternately perform the data transfers in the reader/writer portions 12 and 27, each time one of the reader/writer portion 12 and the reader/writer portion finishes one data transfer, the one finishing the data transfer writes, to the card 2, data indicating the finish of the data transfer and information requesting a next data transfer between the other one and the card 2.

FIG. 7 shows an example of information written in a memory of the card 2 required to perform a next data transfer. As shown in FIG. 7, the request information written in the card 2 contains control parameters (parameters for handshaking, communication sequence number, and state transfer flag for the transmission control and reception control) and transfer data (write data and read data) including data check code for a next data transfer. When one of the reader/writer portions 12 and 27 starts communicating with the card 2, the reader/writer portion first reads the finish data and the request information (parameters and data shown in FIG. 7) from the card 2 and performs a next data transfer with the card 2 while checking based on the control parameters whether or not the write data and the read data are successfully transferred.

At steps C to F repeatedly implemented, data such as negative data are transferred from the terminal 3 to the vending machine 1, and data such as transaction data are transferred from the vending machine 1 to the terminal 3. When all data transfers are completed, the reader/writer portion 12 not receiving read data any more is set to the normal operation mode, and the reader/writer portion 27 receives information indicating completion of the data transfers from the card 2 (step G). The completion of the data transfers is indicated by the LCD 18 or the buzzer 23. Then, the service man moves the terminal 3 with the card 2 out of the communication area of the reader/writer portion 12 and detaches the card 2 from the terminal 3.

As described above, the reader/writer portion 27 of the terminal 3 outputs electromagnetic waves from the antenna 28 to perform a communication based on the electromagnetic waves with the card 2 placed within the communication area of the reader/writer portion 27 and to read or write data from/to the card 2. The control unit 29 of the terminal 3 judges whether or not the card 2 is now in communication with the reader/writer portion 12. When the card 2 is now in communication with the reader/writer portion 12, the control unit 29 forbids the antenna 28 outputting the electromagnetic waves. In contrast, when the card 2 does not communicate with the reader/writer portion 12, the control unit 29 controls the reader/writer portion 27 to start communicating with the card 2 placed within the communication area.

Therefore, even though the card 2 is placed within communication areas of the reader/writer portions 12 and 27 throughout all data transfers between the reader/writer portion 12 and the card 2 and all data transfers between the reader/writer portion 27 and the card 2, the communications between the reader/writer portion 12 and the card 2 are not interrupted with electromagnetic waves of the reader/writer portion 27, and the communications between the reader/writer portion 27 and the card 2 are not interrupted with electromagnetic waves of the reader/writer portion 12.

Accordingly, a large volume of data can be transferred between the reader/writer portion 27 and the reader/writer portion 12 through the card 2 while the card 2 is placed all the time within the communication areas of the reader/writer portions 12 and 27. Further, because it is not required to repeat the detachment and attachment of the card 2 from/to the terminal 3 and the movement of the card 2 between the terminal 3 and the machine 1, the data transferring work can easily be implemented, and the data transfer can reliably and efficiently be performed. For example, to transfer a large volume of negative data from the terminal 3 to the machine 1, it is required to alternately perform the data transfer from the terminal 3 to the card 2 and the data transfer from the card 2 to the vending machine 1. However, because the card 2 can be placed within the communication areas of the reader/writer portions 12 and 27 throughout all the data transfers, the negative data can be efficiently and reliably transferred.

Further, when the antenna 28 outputs no electromagnetic waves, the control unit 29 judges, based on electromagnetic waves outputted from the card 2 or the reader/writer portion 12, whether or not the card 2 is now in communication with the reader/writer portion 12. Accordingly, the control unit 29 can reliably judge whether or not the card 2 is now in communication with the reader/writer portion 12. In particular, when at least a portion of the electromagnetic waves outputted from the card 2 or the reader/writer portion 12 exceed a predetermined threshold level, the control unit 29 judges that the card 2 is now in communication with the reader/writer portion 12. In contrast, when the electromagnetic waves do not exceed the predetermined threshold level, the control unit 29 judges that the card. 2 does not communicate with the reader/writer portion 12. Accordingly, the terminal 3 can reliably detect the communication between the card 2 and the reader/writer portion 12 without using any additional detecting unit denoting a hardware element.

Moreover, before a data transfer between the reader/writer portion 27 and the card 2, the reader/writer portion 27 reads a first control parameter and first transfer data written in the card 2, performs the data transfer of the first transfer data while checking this data transfer on the basis of the first control parameter, and writes a second control parameter and second transfer data in the card 2. Before a data transfer between the reader/writer portion 12 and the card 2, the reader/writer portion 12 reads the second control parameter and second transfer data written in the card 2, performs the data transfer of the second transfer data while checking this data transfer on the basis of the second control parameter, and writes a next first control parameter and next first transfer data in the card 2. Accordingly, each of the reader/writer portions 12 and 27 can perform the data transfer while checking whether or not the data transfer is correctly performed so as to reliably transfer data between the reader/writer portions 12 and 27 through the card 2.

Furthermore, the terminal 3 has the body case 17 accommodating the reader/writer portion 27 so as to be shaped in a handy type, and the holder portion 17a for holding the card 2 within the communication area of the terminal 3. Accordingly, a user can easily operate the terminal 3 with the card 2 while holding the terminal 3 by one hand.

Still further, the reader/writer portion 27 first transfers handshaking data to the card 2. Accordingly, the reader/writer portions 12 and 27 can alternately communicate with the card 2 on the basis of the handshaking data while sharing the operation time.

What is claimed is:

1. A reader/writer, comprising:
a communicating unit that is able to output first electromagnetic waves to perform a communication based on the first electromagnetic waves with a contactless IC card placed within a communication area of the communicating unit;
a judging unit that judges whether or not the contactless IC card placed within the communication area is now in communication with a second reader/writer; and
a communication control unit that forbids the communicating unit outputting the first electromagnetic waves in response to a judgment of the judging unit indicating that the contactless IC card is now in communication with the second reader/writer, and that controls the communicating unit, in response to a judgment of the judging unit indicating that the contactless IC card is not in communication with the second reader/writer, to output the first electromagnetic waves to the contactless IC card placed with the communication area in order to start communicating with the contactless IC card.

2. The reader/writer according to claim 1, wherein
the judging unit judges, based on second electromagnetic waves outputted from the contactless IC card or the second reader/writer and received in the communicating unit, whether or not the contactless IC card is now in communication with the second reader/writer.

3. The reader/writer according to claim 2, wherein
the judging unit judges when the second electromagnetic waves exceed a predetermined threshold level, that the contactless IC card is now in communication with the second reader/writer, and
judges when the second electromagnetic waves do not exceed the predetermined threshold level, that the contactless IC card does not communicate with the second reader/writer.

4. The reader/writer according to claim 1, wherein
the communication control unit reads a first control parameter and first transfer data written in the contactless IC card,
controls the communicating unit to perform a first data transfer of the first transfer data while checking the first data transfer on the basis of the first control parameter, and
writes a second control parameter and second transfer data in the contactless IC card such that the second reader/writer performs a second data transfer of the second transfer data with the contactless IC card while checking the second data transfer on the basis of the second control parameter.

5. The reader/writer according to claim 1, further comprising a body case accommodating the communicating unit, the judging unit and the communication control unit, and a holder portion for holding the contactless IC card within the communication area of the communicating unit, wherein the body case is shaped so as to be able to be hand-held.

6. The reader/writer according to claim 1, wherein the communication control unit controls the communicating unit to first transfer handshaking data to the contactless IC card such that the communicating unit and the second reader/writer alternately communicate with the contactless IC card on the basis of the handshaking data.

7. The reader/writer according to claim 1, wherein the contactless IC card is placed in both the communication area of the communicating unit and a communication area of the second reader/writer.

8. A vending machine management system, comprising:

a contactless IC card;

a hand-held reader/writer that is able to output first electromagnetic waves to perform a communication based on the first electromagnetic waves with the contactless IC card placed within a communication area of the hand-held reader/writer; and a vending machine that is able to output second electromagnetic waves to perform a communication based on the second electromagnetic waves with the contactless IC card placed within a communication area of the vending machine, wherein the hand-held reader/writer outputs the first electromagnetic waves to start communicating with the contactless IC card placed within the communication area of the hand-held reader/writer in response to the contactless IC card not communicating with the vending machine, and the vending machine outputs the second electromagnetic waves to start communicating with the contactless IC card placed within the communication area of the vending machines in response to the contactless IC card not communicating with the hand-held reader/writer.

9. The management system according to claim 8, wherein the hand-held reader/writer outputs no first electromagnetic waves in response to the second electromagnetic waves exceeding a first threshold level and being received from the contactless IC card or the vending machine, and outputs the first electromagnetic waves in response to no reception of the second electromagnetic waves exceeding the first threshold level from the contactless IC card or the vending machine, and the vending machine outputs no second electromagnetic waves in response to the first electromagnetic waves exceeding a second threshold level and being received from the contactless IC card or the hand-held reader/writer, and outputs the second electromagnetic waves in response to no reception of the first electromagnetic waves exceeding the second threshold level from the contactless IC card or the hand-held reader/writer.

10. The management system according to claim 8, wherein the hand-held reader/writer outputs the first electromagnetic waves in response to the contactless IC card which does not communicate with the vending machine and is placed within the communication areas of the hand-held reader/writer and the vending machine, and the vending machine outputs the second electromagnetic waves in response to the contactless IC card which does not communicate with the hand-held reader/writer and is placed within the communication areas of the hand-held reader/writer and the vending machine.

\* \* \* \* \*